(12) United States Patent
Mendenhall et al.

(10) Patent No.: US 6,483,951 B1
(45) Date of Patent: *Nov. 19, 2002

(54) DIGITAL VIDEO FILTER SEQUENCE FOR BANDWIDTH CONSTRAINED SYSTEMS

(75) Inventors: Todd C Mendenhall, San Jose, CA (US); Darren D. Neuman, San Jose, CA (US)

(73) Assignee: LSI Logic Corporation, Milpitas, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 112 days.

(21) Appl. No.: 09/105,962

(22) Filed: Jun. 26, 1998

(51) Int. Cl.[7] .......................... G06K 9/32; H04N 11/20; H04N 1/46
(52) U.S. Cl. ..................... 382/300; 348/441; 358/525
(58) Field of Search ..................... 382/306, 264, 382/258, 263, 260, 261, 298, 299; 348/538, 571, 572, 441, 575, 556, 663, 581, 445, 455, 459, 458; 358/525, 428

(56) References Cited

U.S. PATENT DOCUMENTS

| | | | | |
|---|---|---|---|---|
| 4,631,750 A | * | 12/1986 | Gabriel et al. | 382/41 |
| 5,119,193 A | * | 6/1992 | Noji | 358/166 |
| 5,485,215 A | * | 1/1996 | Meyer et al. | 348/423 |
| 5,528,301 A | * | 6/1996 | Hau et al. | 348/441 |
| 5,530,484 A | * | 6/1996 | Bhatt et al. | 348/556 |
| 5,574,572 A | * | 11/1996 | Malinowski et al. | 358/451 |
| 5,602,870 A | * | 2/1997 | Hailey et al. | 375/230 |
| 5,764,305 A | * | 6/1998 | Kondo | 348/571 |
| 5,844,617 A | * | 12/1998 | Faroudja et al. | 348/441 |
| 5,847,772 A | * | 12/1998 | Wells | 348/571 |
| 5,881,179 A | * | 3/1999 | Gillard | 382/261 |
| 5,920,354 A | * | 7/1999 | Fedele | 348/446 |
| 5,920,495 A | * | 7/1999 | Hicok et al. | 364/724.05 |
| 5,977,947 A | * | 11/1999 | Potu | 345/127 |
| 6,137,904 A | * | 12/2000 | Lubin et al. | 382/162 |

* cited by examiner

*Primary Examiner*—Jose L. Couso
*Assistant Examiner*—Kanji Patel
(74) *Attorney, Agent, or Firm*—Conley, Rose & Tayon

(57) ABSTRACT

A video filter unit is described which is implemented as a three-stage filter comprising a vertical filter, a horizontal decimation filter, and a horizontal interpolation filter. The three stages of the filter unit preferably connect serially with the vertical filter comprising the input first stage, the horizontal decimation filter comprising the second stage and the horizontal interpolation filter comprising the third stage which provides the output filtered image from the filter unit. As such, the video data to be filtered is provided to the vertical filter which provides its output to the horizontal decimation filter. After horizontal decimation, which can be disabled if desired (i.e., no horizontal decimation), the video data is then horizontally interpolated. The horizontal interpolation filter stage can also be disabled if desired. The vertical filter can be configured to operate either as a decimation filter or an interpolation filter. The vertical filter is a four-tap filter and thus calculates weighted averages of four video values (e.g. luminance values) at a time. The horizontal decimation filter preferably is implemented as a two-tap filter and thus averages two video values at a time. Lastly, the horizontal interpolation filter comprises an eight-tap filter and, accordingly, calculates a weighted average of eight video values.

14 Claims, 7 Drawing Sheets

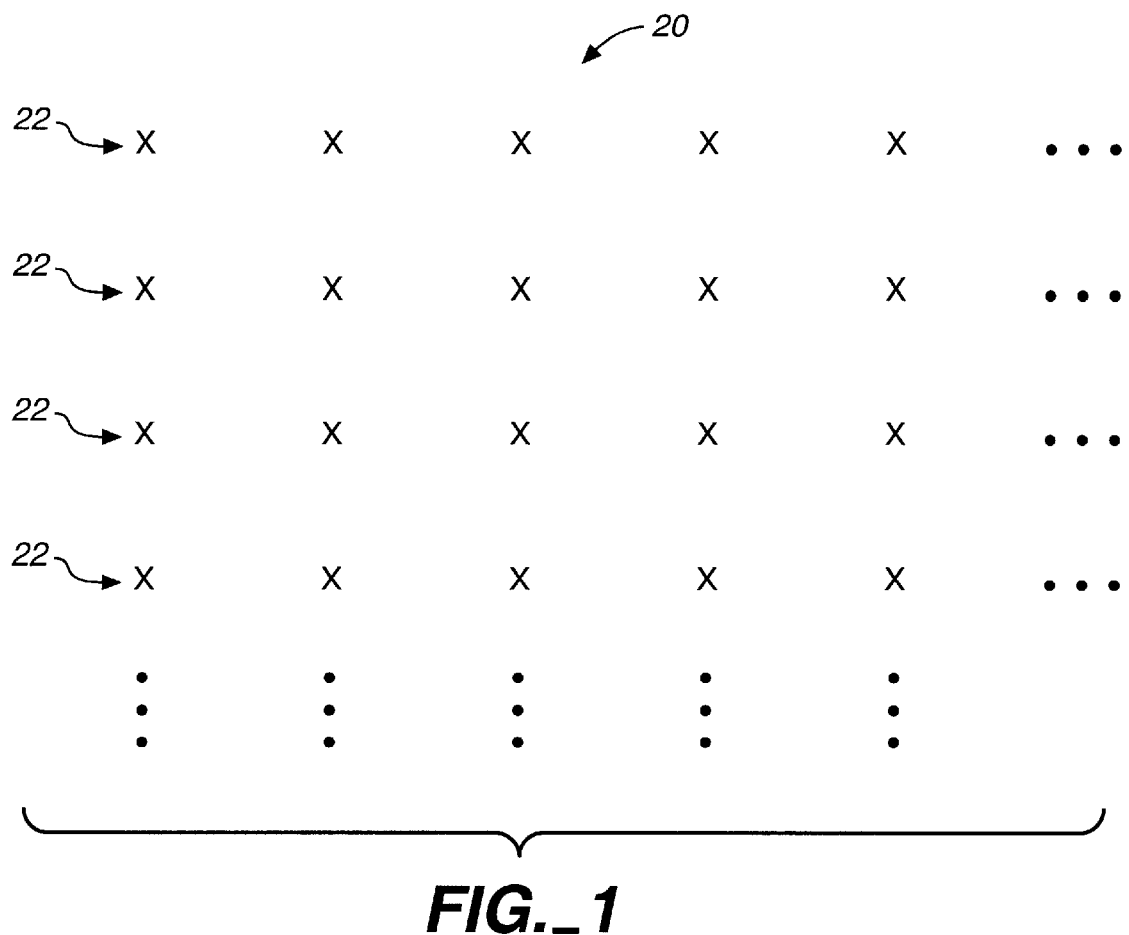
FIG._1
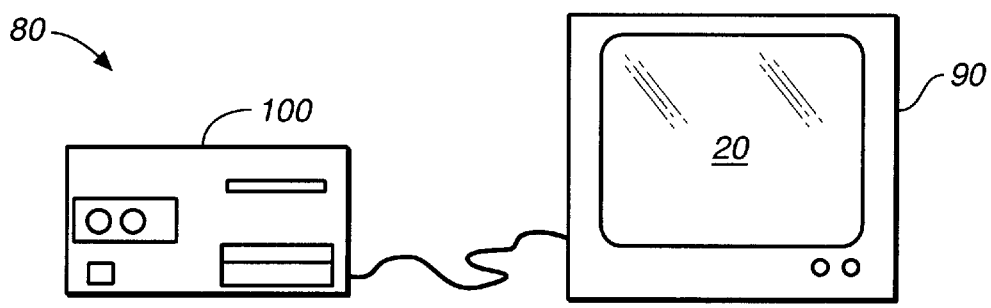
FIG._2

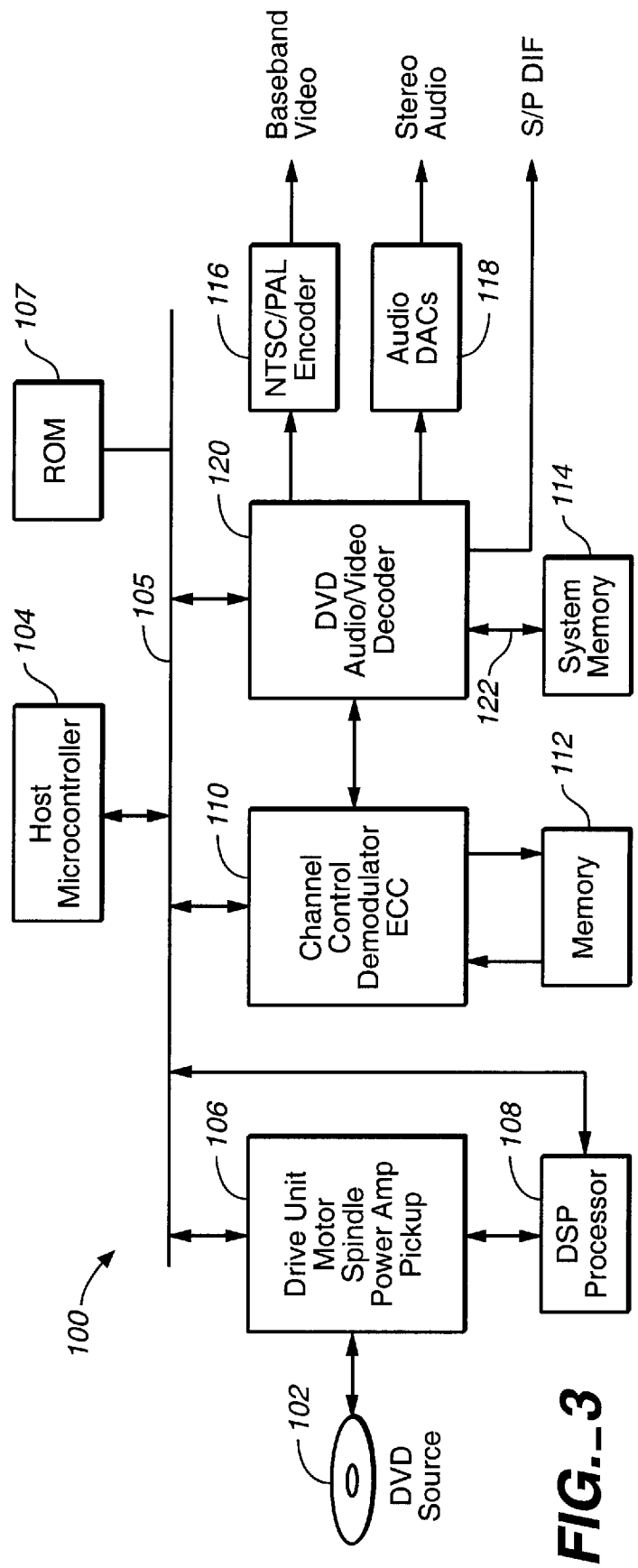
FIG._3

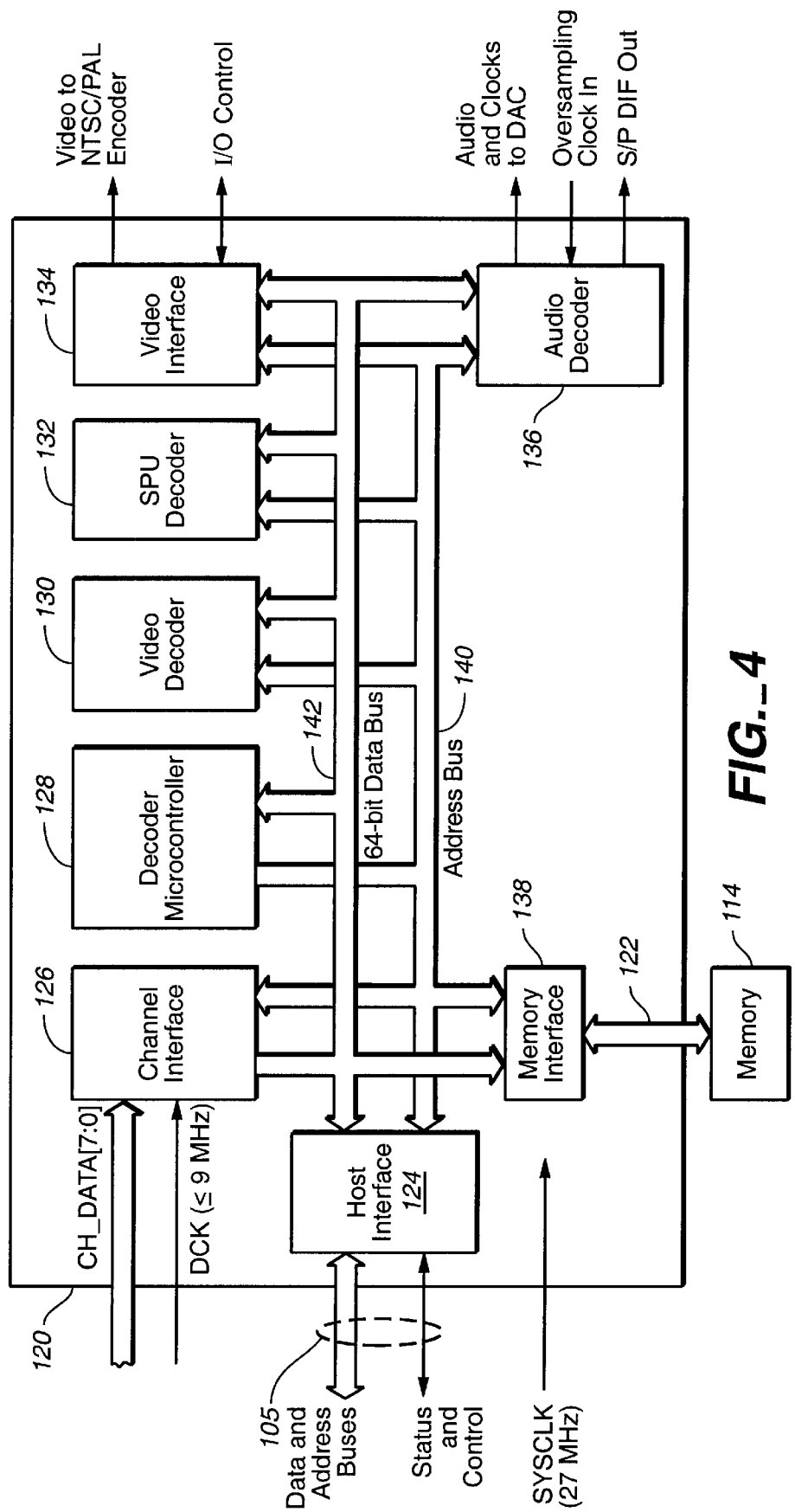
FIG._4

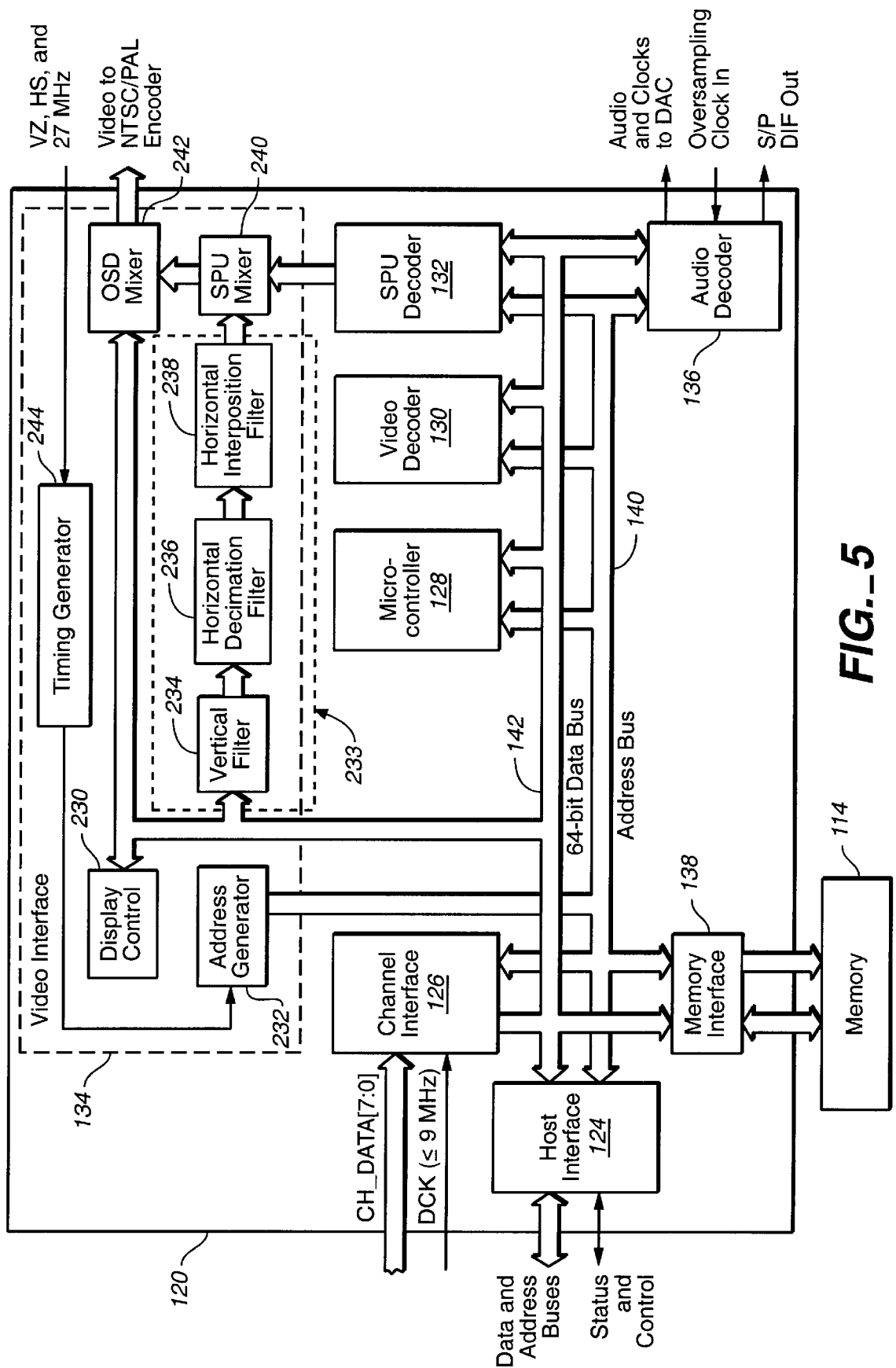
FIG._5

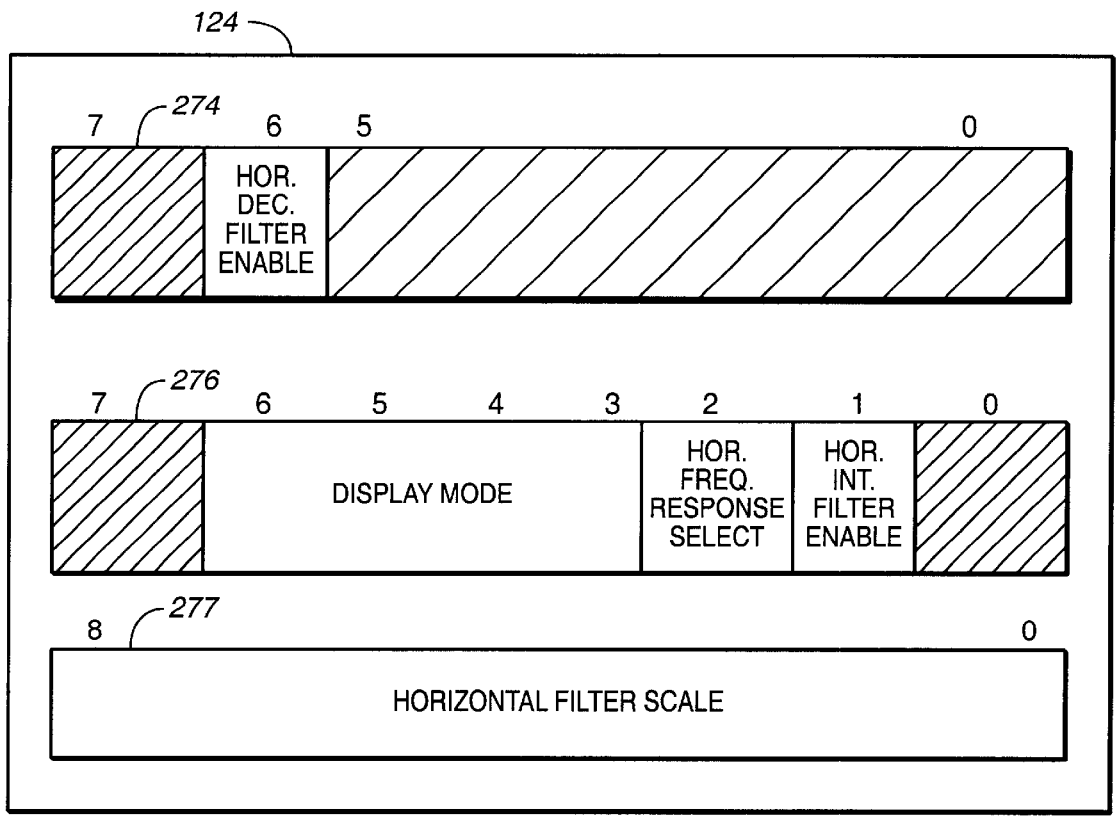
FIG._6
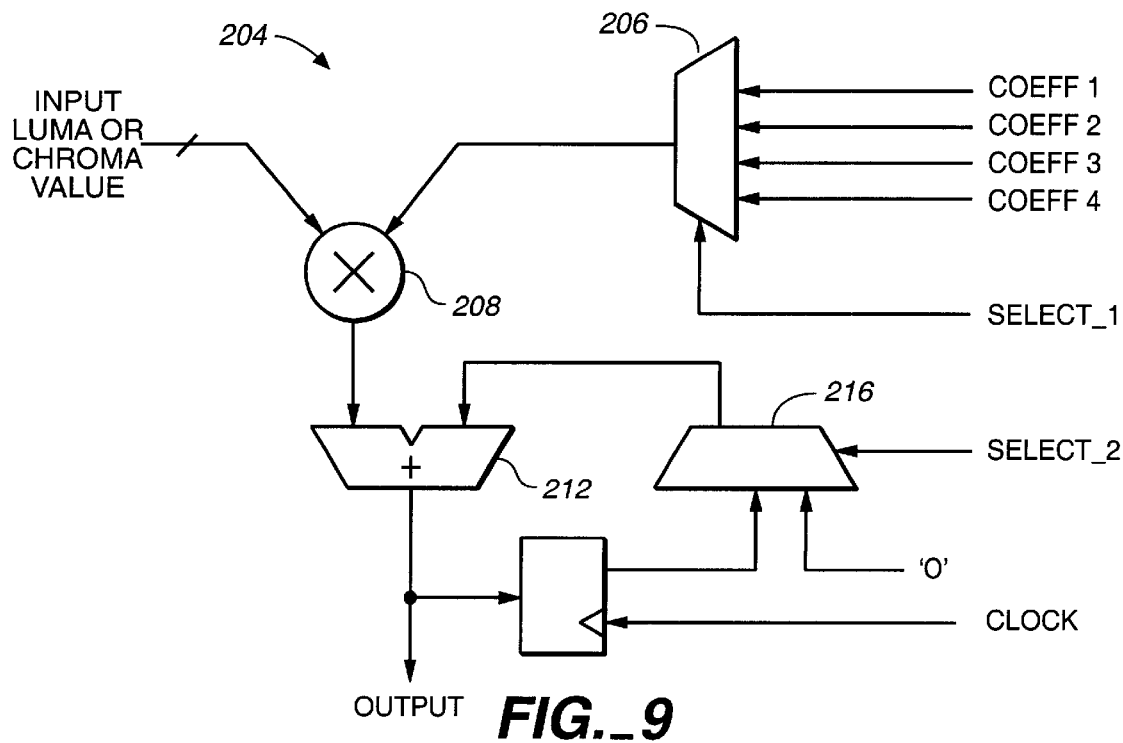
FIG._9

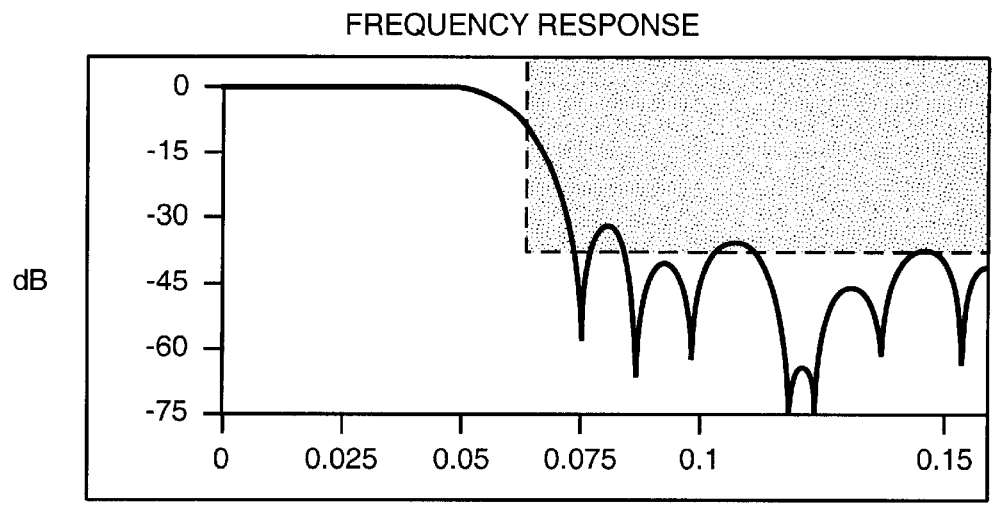
FIG._7A
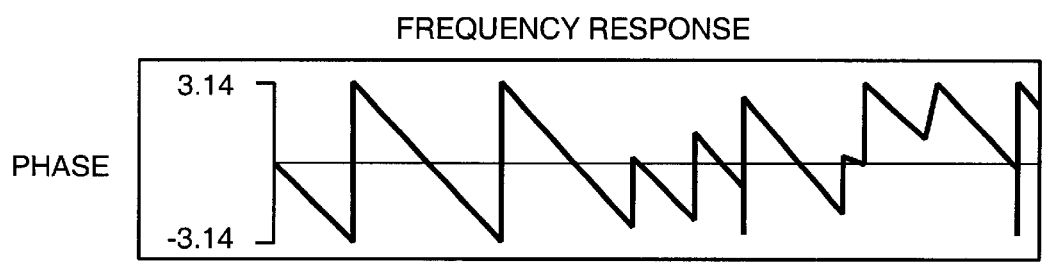
FIG._7B
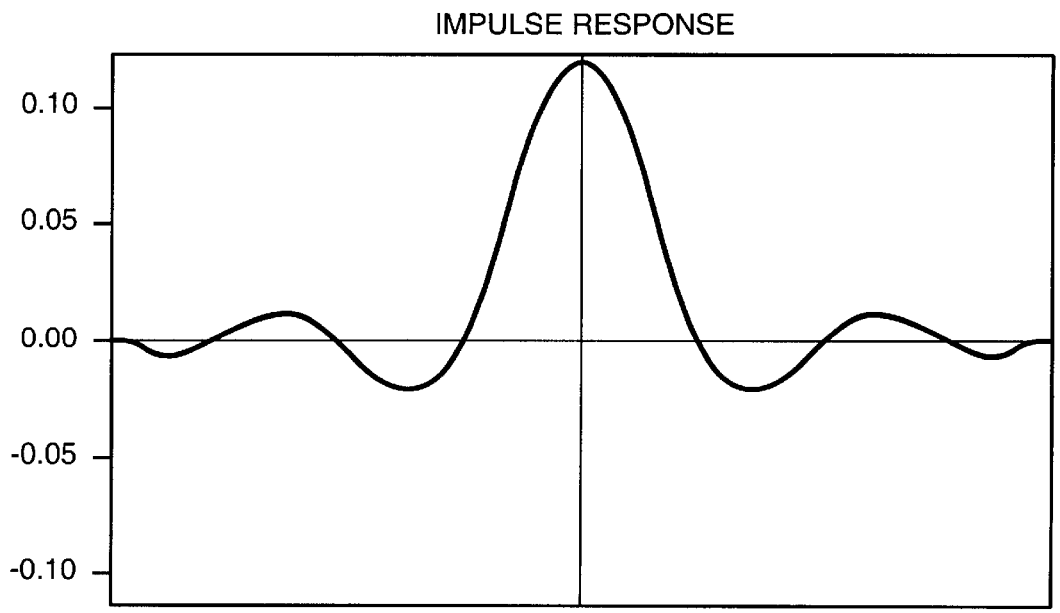
FIG._7C

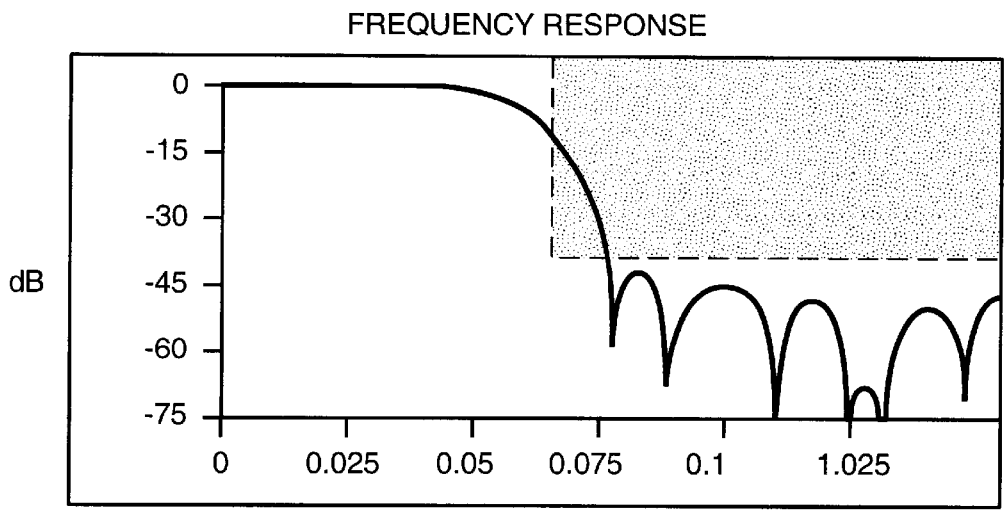
FIG._8A
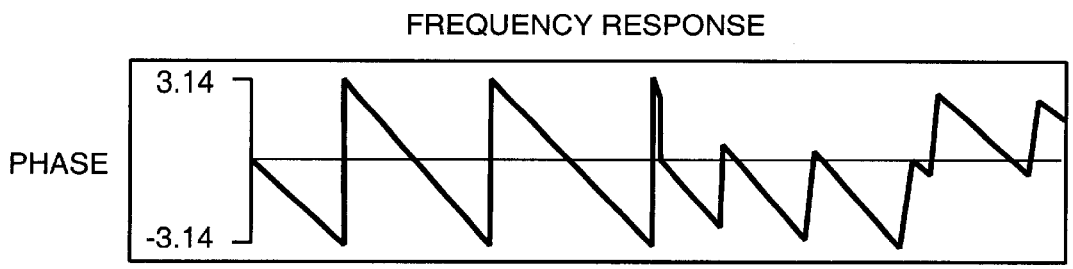
FIG._8B
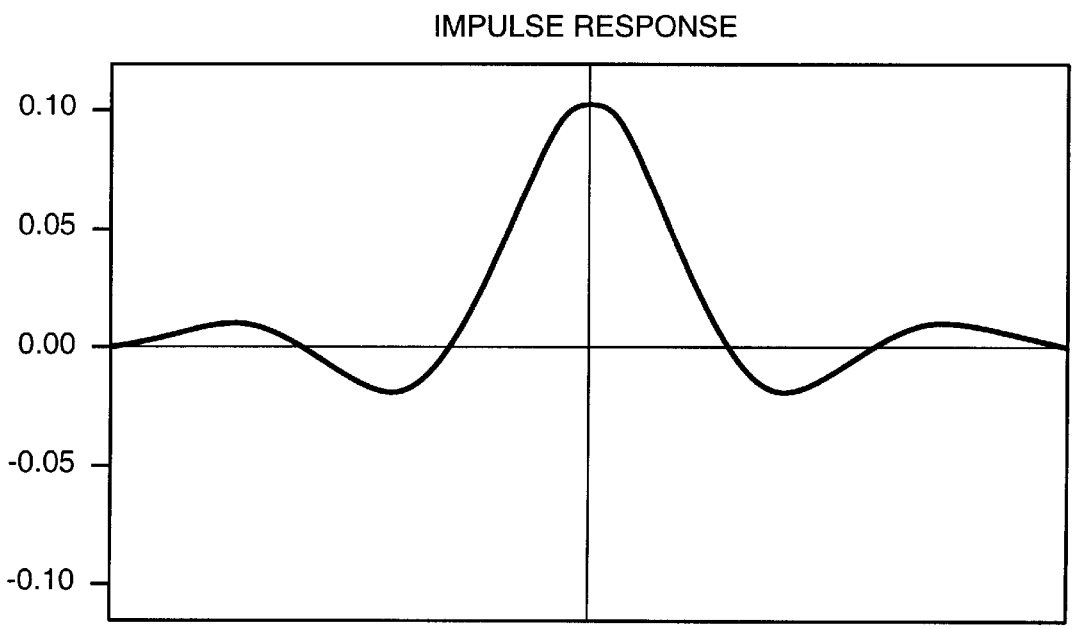
FIG._8C

DIGITAL VIDEO FILTER SEQUENCE FOR BANDWIDTH CONSTRAINED SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to video processing systems. More particularly, the present invention relates to filtering pixel data in a, video processing system. More particularly still, the invention relates to filter architecture for a digital video processing system.

2. BACKGROUND OF THE INVENTION

The consumer electronics industry has experienced a dramatic explosion in product development over the last 20 years. This explosion has been fueled by consumer demand coupled with significant advances in semiconductor technology that have lead to lower cost semiconductor devices incorporating significantly more functionality than previously possible. For example, a hand-held calculator from 20 years ago provided the ability to perform rudimentary mathematical operations. Today, a hand-held device can provide much of the functionality of a desktop computer system.

The visual display of information to the user is of particular importance to the consumer electronics industry. The most notable examples of visual displays include televisions and personal computers. Other types of consumer electronics, including stereo receivers and hand-held computers, also include visual displays. Visual displays typically comprise a grid of evenly spaced "pixels." FIG. 1, for example, shows a portion of a pixel grid 20 with a plurality of pixel lines 22. Each line includes multiple pixels denoted by the symbol 'X'. A typical television screen format includes 480 lines of pixels with each line comprising 720 pixels (i.e., 720×480). The size and spacing of the pixel lines in FIG. 1 have been exaggerated for clarity.

Each pixel in a line is represented by one or more data values. For example, each pixel can be represented in a "RGB" format which includes red, green, and blue color components. Alternatively, each pixel can be represented in a "YUV" or "YCrCb" format. In either the YUV or YCrCb formats, the "Y" value represents luminance ("luma") which determines the brightness of the pixel. The U and V values represent chrominance ("chroma") components which determine color and are calculated as the difference between the luminance components and the red and blue color values; that is, U=Y−R and V=Y−B. The Cr and Cb values also represent chrominance and are scaled versions of the U and V chrominance values.

Video systems often represent images digitally. That is, each pixel comprising the image is represented by a digital YCrCb value, or a value in accordance with another format. To facilitate the transmission and storage of moving pictures, which generally involve voluminous amounts of pixel data, various encoding and compression techniques are used to process the data. One such technique is the Moving Pictures Experts Group (MPEG) standard commonly implemented in digital video disk (DVD) drives and other types of video equipment.

It is often desirable to filter the digital pixel values which represent a moving image. For example, common interchange format ("CIF") images are formatted as 352×240 (i.e, 352 columns and 240 lines). To display a CIF image on a 720×480 television displays requires the conversion of the 352×240 CIF pixel format to the 720×480 television format. Part of the conversion involves "upsampling" (also referred to as interpolating 352 pixels in each line to 720 pixels and 240 lines to 480 lines). Filtering pixels across a line is called "horizontal filtering" and thus a horizontal filter that converts a line of pixels into more pixels is referred to as a horizontal interpolation filter. It may also be desirable to expand an image vertically. Such a process is performed by a "vertical interpolation filter" which filters pixel values in a vertical column of pixels.

Video data must be provided to the display device at a fixed rate which typically is 30 frames of video per second for television. A frame refers to the set of all pixels on the screen (720×480) at each instance in time. A display rate of 30 frames per second is fast enough to appear to the human eye as a continuous image, and not a series of images captured at discrete points in time. All of the filtering and other processing that is to occur on a single frame therefore must be performed in less than one-thirtieth of a second.

The ability to filter digital video images has fueled a demand for additional types of filtering. For example, it has become desirable to reduce the size of an image. This process is referred to as "decimation." Additionally, it is desirable to increase the quality of video images. As the requirements for video filters increase, it is imperative to develop high quality video filters that can operate more efficiently and be produced at a lower cost. Such filters will provide high quality video images decimated or interpolated from an initial image at the desired display rate, but do so in an efficient manner so as to minimize system cost.

BRIEF SUMMARY OF THE INVENTION

The deficiencies noted above are solved in large part by a video filter unit implemented as a three-stage filter comprising a vertical filter, a horizontal decimation filter which reduces the horizontal dimension of an image, and a horizontal interpolation filter which expands the horizontal dimension of an image. The three stages of the filter unit preferably are connected serially with the vertical filter comprising the input first stage, the horizontal decimation filter comprising the second stage and the horizontal interpolation filter comprising the third stage. With this filter archtiecture, the input video data to be filtered is provided to the vertical filter which provides its output to the horizontal decimation filter. The vertical filter can be configured to operate either as a decimation filter or an interpolation filter. After horizontal decimation, which can be disabled if desired (i.e., no horizontal decimation), the video data is then horizontally interpolated. The horizontal interpolation filter stage can also be disabled if desired.

The vertical filter is implemented in the preferred embodiment as a four-tap filter and thus calculates weighted averages of four video values (e.g. luminance values) at a time. The horizontal decimation filter preferably is implemented as a two-tap filter and thus averages two video values at a time. Lastly, the horizontal interpolation filter comprises an eight-tap filter and, accordingly, calculates a weighted average of eight video values. By placing the eight-tap horizontal interpolation filter as the last stage in the video unit, the horizontal interpolation filter can provide output video data at the display rate of the video system in which the video filter unit operates. If the horizontal interpolation filter was included in an earlier stage of the filter, the filter would have to operate at a higher rate to produce output values at the required display rate. By permitting the high tap count horizontal interpolation filter to operate at the slowest rate possible, that filter can be implemented with a lower power and lower cost design.

These and other advantages will become apparent once the following disclosure and accompanying drawings are read.

BRIEF DESCRIPTION OF THE DRAWINGS

For a detailed description of the preferred embodiments of the invention, reference will now be made to the accompanying drawings in which:

FIG. 1 shows a portion of a pixel grid;

FIG. 2 shows a DVD drive connected to a display;

FIG. 3 is a block diagram of the DVD drive of FIG. 2 constructed in accordance with the preferred embodiment;

FIG. 4 shows a block diagram of a preferred embodiment of an audio/video decoder included in the DVD drive of FIG. 3;

FIG. 5 is a block diagram of a video interface included in the audio/video decoder of FIG. 4 including a multi-stage video filter architecture implemented in accordance with the preferred embodiment;

FIG. 6 shows several control registers included in the host interface of FIG. 5 used to configure the filter of FIG. 5;

FIGS. 7A–7C illustrate a selectable amplitude, phase and impulse response, respectively of the filter of FIG. 5;

FIGS. 8A–8C illustrate an alternative selectable amplitude, phase and impulse response, respectively, of the filter of FIG. 5; and FIG. 9 shows an exemplary embodiment of one of the stages of the filter architecture of FIG. 5.

Certain terms are used throughout the following description and claims to refer to particular system components. As one skilled in the art will appreciate, video system companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Referring now to FIG. 2, video system 80 constructed in accordance with the preferred embodiment generally includes a display device 90 coupled to a video player 100. Video player 100 will be described throughout this disclosure as a digital video disk (DVD) system. The principles of the present invention, however, can be applied to other types of video equipment such as digital video set-top boxes. Moreover, the invention can be adapted to any type of video equipment that includes filtering of pixel data. Display device 90 preferably is a television set or other type of monitor. Further, DVD system 100 could be incorporated into a personal computer system and thus could be coupled to a computer display. The preferred embodiment includes a low cost, high quality, efficient video filter and will be explained in detail with reference to FIGS. 5–9.

Referring now to FIG. 3, DVD system 100 preferably includes a host microcontroller 104, a drive unit motor/spindle power amplifier/pickup 106, read only memory (ROM) 107, a DSP, processor 108, a channel controller demodulator/ECC 110, memory 112, memory 114, NTSC/PAL encoder 116, audio digital-to-analog converters 118, and a DVD audio/video decoder 120. Alternatively, the audio and video processing functions of audio/video decoder 120 can be implemented with separate devices. Thus, audio/video decoder 120 can be replaced with a video processor, and an audio processor could be included as part of DVD drive 100 as a separate component.

The host microcontroller 104 couples to the drive unit motor spindle power amplifier pickup 106, DSP processor 108, channel control demodulator/ECC 110, and DVD audio/video decoder 120 via a bus 105 which includes data and address busses and status and control signals. The bus is implemented with any suitable protocol commonly available or custom designed. In accordance with the preferred embodiment, DVD system 100 is capable of receiving and processing MPEG video and audio data. The DVD system can implement either the MPEG-1 or MPEG-2 decoding techniques. Alternately, DVD system 100 can be adapted to process data compressed according to other techniques besides MPEG if desired.

A DVD disk 102 can be inserted into DVD system 100. The DVD audio/video decoder 120 generally receives demodulated, coded audio and video data from the DVD disk 102 through the channel control demodulator/ECC 110 and produces a decoded audio and video output data stream to the NTSC/PAL decoder 116 (for video) and audio digital-to-analog converters 118 (for audio). The DVD audio/video decoder 120 also provides a Sony/Philips digital interface (S/P DIF) formatted output stream which is a format commonly known to those of ordinary skill.

The host microcontroller 104 preferably can be any general purpose microcontroller, such as those made by Intel or Motorola. The host microcontroller 104 generally controls the operation of the DVD system. The microcontroller 104 executes an initialization routine to test the system's components during power up and responds to functions selected by the user through input controls (not shown).

The memory 114 preferably is implemented as synchronous dynamic random access memory (SDRAM), although other types of memory devices can be used as well, such as conventional DRAM and extended data out DRAM (EDO DRAM). In accordance with the preferred embodiment, memory 114 comprises a SDRAM device with a 16 Mbit capacity and an 81 MHz clock speed capability. Examples of suitable SDRAM devices include the KM416S1120A manufactured by Samsung or the µpD4516161 manufactured by NEC. Further, and if desired, memory 114 may be implemented as two or more SDRAM modules. Thus, if two 16 Mbit SDRAM devices are used, the total memory capacity of memory 114 is 32 Mbits, The ROM 107 preferably is used to store on-screen display data as well as other configuration information and code. During system initialization, the host microcontroller 104 transfers a copy of the OSD data sets from ROM 107 across bus 105 through the DVD audio/video decoder 120 and into memory 114. The DVD audio/video decoder 120 receives video data from the channel control demodulator/

ECC 110 and OSD data from memory 114. The DVD audio/video decoder 120 then mixes the OSD data with the video signals and provides a video output signal to the NTSC/PAL encoder 116.

Drive unit motor motor/spindle power amplifier/pickup 106 generally includes motors to spin the DVD disk 102 and includes read heads to read data from the disk 102. Drive unit motor 106 may also include write heads for writing data to disk 102. Any suitable type of drive unit motor motor/ spindle power amplifier/pickup can be used.

Referring still to FIG. 3, the DSP processor 108 provides filtering operations for write and read signals, and acts as a controller for the read/write components of the system (not specifically shown). The DSP controller 108 controls the drive motors included in the drive unit motor motor/spindle power amplifier/pickup 106. The DSP processor 108 may be implemented as any suitable DSP processor.

The channel controller demodulator/ECC 110 preferably decodes and buffers the read data from the DVD disk 102 in order to control the rate of the video and audio bitstreams. The channel controller demodulator/ECC 110. also includes an error correction code (ECC) decoder to decode the demodulated signal. Any suitable channel control demodulator/ECC can be used.

The NTSC/PAL encoder 116 receives processed digital video data from audio/video decoder 120 and generally converts the received video bitstream to a predefined analog format. The encoder 116 typically comprises an NTSC/PAL rasterizer for television, but may also be a digital-to-analog converter for other types of video formats. The audio digital-to-analog converters 118 receive a digital representation of the audio signal from the audio/video decoder 120 and, according to known techniques, converts the signal into an analog audio signal that can be played through a speaker.

Referring now to FIG. 4, the audio/video decoder 120 preferably includes a host interface 124, a channel interface 126, a decoder microcontroller 128, a video decoder 130, a sub-picture unit (SPU) decoder 132, a video interface 134, an audio decoder 136, and a memory interface 138. As shown, these components are coupled together via a 64-bit data bus 142 and an associated address bus 140. The interface to the channel control demodulator/ECC 110 is provided by the channel interface 126. The interface to bus 105, and thus host microcontroller 104 is provided by host interface 124. The memory interface 138 provides the interface for the decoder 120 to memory 114. The video interface 134 generates video data to be provided to NTSC/PAL encoder 116 and the audio decoder 136 generates the output digital audio data to be provided to digital-to-analog converters 118. Audio decoder 136 also generates the S/P DIF audio output stream. The following discussion describes functional units depicted in FIG. 3 relevant to the preferred embodiment in greater detail.

The host interface 124 preferably includes registers, read and write FIFO (first in first out) buffer is, and other logic (not shown) to permit the host microcontroller 104 to communicate with the audio/video decoder 120. Communication between the microcontroller 104 and decoder 120 preferably is through the use of the registers in the host interface 124, although other communication techniques can be implemented as well. In accordance with the preferred embodiment, the host microcontroller 104 writes video, audio, and configuration data and other status information to predefined registers and the host interface 124. The decoder 120 continuously or periodically monitors the registers for updated information and responds accordingly. Similarly, decoder 120 communicates information to the host microcontroller 104 through the use of the registers.

Referring still to FIG. 4, the channel interface 126 preferably accepts byte-wide MPEG data streams from the channel control demodulator ECC 110 (FIG. 2) over the CH_DATA[7:0] bus. The channel interface 126 indicates to the channel control demodulator ECC 110 that the channel interface 126 is ready to receive a new byte of encoded video or audio data. When the channel device 110 places the requested data on the CH_DATA bus, the channel device 110 asserts audio or video valid signals, a depending on whether the data to be transferred represents audio or video. These valid signals indicate that the requested data is available to the channel interface 126.

If desired, a DCK clock input signal may be provided to the channel interface 126. If implemented, the DCK signal preferably has a frequency of less than or equal to 9 MHz, although frequencies greater than 9 MHz can also be used. The DCK clock signal preferably is generated by the external channel device 110. The DCK clock signal, in conjunction with the valid signals, is used to write data synchronously to the channel interface 126. When the DCK clock input signal is connected to channel interface 126, the channel interface 126 uses the clock to synchronize the input valid signals before strobing the data into the channel interface 126. This method for inputting data into the channel interface, 126 is preferred for connecting external channel devices 110 that do not have clean valid signals. Alternatively, the channel interface 126 can be configured for receiving audio and video data asynchronously. In the asynchronous mode, the DCK clock input pin preferably is grounded and the channel data is placed into the channel interface upon the assertion of request and valid control signals (not shown). As such, the data is not latched into the channel interface 126 synchronously with the DCK clock signal.

The channel interface 126 preferably also strips the packets of headers from the MPEG data stream and writes the header packet data payloads into separate buffer areas in memory 114. The host microcontroller 104 preferably defines a circular buffer within memory 114 by specifying the start and end addresses to each of the buffer areas in registers (not specifically shown). The channel interface 126 manages the reading and writing of each buffer defined in memory 114. When the channel interface 126 strips an item out of the bitstream, the decoder microcontroller 128 retrieves the current write location of the buffer area for that item and writes the item into the buffer.

The video decoder 130 generally receives MPEG video data from memory 114, performs "post-parsing" on the data, decompresses and decodes the data and stores the processed data back in memory 114 in video frame form. The post-parsing process strips off all header information and stores the header information in memory (not shown) for use in the decoding process. The channel interface 126 parses pack, system and packet headers from the MPEG bitstream and stores video packet payloads in memory 114. The preparsed video data is read from the memory 114 into the channel interface 126.

The video decoder 130, along with the decoder microcontroller 128, performs post-parsing by stripping the bitstream apart, and passing the appropriate bits and fields in the stream to the microcontroller 128 for use in picture decoding and reconstruction. The video decoder 130 also decodes layer of syntax in the MPEG bitstream starting from the sequence layer and going through all of the lower layers including the group of picture layer, picture layer, slice layer, macro block layer and block layer, all of which are known to those skilled in the art, The video decoder 130 also decodes the block layer data per instructions received from the decoder microcontroller 128. The results are placed in the frame stores of memory 114 as picture bitmaps. The video interface 134 reads the picture data from memory 114, mixes it with SPU and OSD video and sends the mixed data to:be external NTSC/PAL encoder 116 (FIG. 5). The video decoder 130 also includes buffers that are used to store certain parameters from each of the layers of syntax. The data in these buffers (not specifically shown) is available through the registers included in the host interface 124 described above. In general, this data is useful for controlling the decoder 130.

Referring still to FIG. 4, the SPU decoder 132 decodes SPU bitstreams as defined in the DVD Specification for Read-only Disk. The SPU decoder 132 preferably controls both the memory 114 buffer pointers and various on-chip FIFO pointers. Further, SPU decoder 132 analyzes each SPU command and controls the entire SPU decoding schedule as well as decoding the pixel data compressed by run-length encoding techniques.

The memory interface 138 preferably configures memory 114 into a 512×16-bit page size with a page break penalty of 6 to 7 cycles. The memory interface preferably also implements a column address strobe (CAS) latency of 3 and a burst length of 4. The memory bus 122 preferably comprises a 16-bit data bus, a 12-bit address bus, various chip selects signals and other control signals as would be understood by those of ordinary skill in the art. The memory 114 preferably includes at least one SDRAM device, but may include one or more additional SDRAM's as desired. Many types of data may be stored in memory 114. For example, OSD graphics data, audio and video data, MPEG system header channel data, SPU channel data, and Navi Bank or private stream channel data may be stored in memory 114.

In accordance with the preferred embodiment, the decoder microcontroller 128 controls arbitration to memory 114. Memory arbitration is required because various devices and processes may concurrently require memory access. The arbitration algorithm gives higher priority to some devices requesting memory access and lower priority to others. The arbitration priority preferably favors the MPEG video decoder 130 and channel interface 126. The next highest priority is given to the SPU decoder 132. The next lowest priority is given to the host interface 124, block data move transactions, and direct memory access (DMA) data transfers. Lastly, memory refresh is given lowest priority. Other arbitration schemes can be implemented if desired.

Because the preferred memory configuration is 16 bits wide, the memory interface preferably performs the conversion between the 16-bit memory bus 122 to the 64-bit internal data bus of the audio/video decoder 120. The host microcontroller 104 and the decoder microcontroller 128 address memory 114 assuming an 8-byte wide data transfer configuration. The memory interface 138 changes these addresses to suitable chip selects, bank selects, and column and row addresses for the memory 114.

Referring now to 5, the video interface 134 preferably includes a display control 230, an address generator 232, a filter unit 233, a sub-picture unit (SPU) mixer 240, an on-screen display (OSD) mixer 242, and a timing generator 244. The address generator 232, under control of the timing generator 244, addresses the video frames stored in memory 114 to read pixel data into the post-processing filters 234, 236, and 238. The address generator 232 also commands display control 230 and reads OSD bitmap data into the OSD mixer 242. The filter 233 modifies the pixel data based on instructions from the display control 230 to perform various video operations such as "letter boxing," "3:2 pulldown," "pan and scan."

The display control 230 sets the location of the video image on the display 90 (FIG. 2) with respect to sync signals (not shown) to account for the requirements of several different timing systems and display modes. The output signal from the filter 233 is then processed by SPU mixer 240 which adds SPU data from the SPU decoder 132 to the video data stream from filter 238.

The OSD mixer 242 mixes together the processed video data from SPU mixer 240 with an OSD image retrieved from memory 114. The output data stream from OSD mixer 242 is then provided to NTSC/PAL encoder 116 (FIG. 3).

In accordance with the embodiment, filter 233 includes a vertical filter 234, a horizontal decimation filter 236, and a horizontal interpolation filter 238. The sequence of the filters (vertical filter followed by horizontal decimation filter followed by horizontal interpolation filter) is preferred and comprises a relatively low cost, efficient, high quality filter architecture. These benefits will be explained below.

The vertical filter can perform either vertical decimation or interpolation. Decimation is the process of reducing the size of the image. For example, a two-to-one (2:1) vertical decimation process reduces a 480 line image down to 240 lines. Interpolation (also referred to as "upsampling") is the opposite process by which an image is stretched or expanded. Vertical interpolation expands the vertical dimension of an image. The filter 233 also includes a horizontal decimation filter 236 which reduces the horizontal dimension of an image and a horizontal interpolation filter 238 which expands the horizontal dimension of a filter. As explained below, each horizontal filter can be independently disabled if desired. However, it may be desired to have both horizontal filters running to produce images with a horizontal width not directly obtainable by either filter. For example, three-fourths decimation is achieved by 2:1 horizontal decimation and then a subsequent interpolation to the desired three-fourths size.

The vertical filter 234 preferably includes a four-tap luma filter and a two-tap chroma vertical filter. A "tap" refers to the filter's ability to multiply a video value (luma or chroma) by a coefficient. A four-tap filter, for example, refers to a filter that can calculate a weighted average of four lumas. These filters are used to interpolate and reposition luma and chroma lines to improve picture quality. An exemplary embodiment of the logic comprising each tap in the two and four tap filters is shown in FIG. 9. As shown, each tap preferably includes a multiplier/accumulator ("MAC") 204 comprising a multiplexer 206, a multiplier 208, an adder 212, a multiplexer 260, and a latch 220. One of four coefficients, COEFF 1-COEFF 4, is selected through multiplexer 206 via select line SELECT_1. The coefficient selected is multiplied by multiplier 208 by one of the luma or chroma values provided to the filter from a line buffer (not specifically shown). Each product of luma value and coefficient is added via adder 212 to an accumulated product of previous luma or chroma value-coefficient products. The output of adder 212 is clocked into latch 220 and routed back into an input of adder 212 via multiplexer 216. The multiplexer 216 functions to add in an initial zero value to the initial luma value-coefficient product to "clear" the MAC 204. Multiplexers 206 and 216 are operated via the SELECT_1 and SELECT_2 signals and the latch 220 is clocked by a clock signal. The coefficient, clock, and selects signals preferably are generated by other logic (not specifically shown) in vertical filter 234 or by microcontroller 128. The multiplier/accumulator architecture shown in FIG. 9 is intended to be a general architecture for performing either vertical decimation or interpolation.

The filters 234, 236, 238 are programmable through registers 274 and 276 included in host interface 124 and illustrated in FIG. 6. The bits in registers 274, 276 relevant to the preferred embodiment of the invention are identified as bit 6 in register 274 and bits 1-6 in register 276. The remaining bits in these registers are not specifically identified and thus are shown in cross-hatch. Registers 274, 276 preferably are provided as part of the register set included as part of the host interface through which the host microcontroller 104 and audio/video decoder 120 communicate with each other as noted above.

Bit 6 in register 274 enables and disables the horizontal decimation filter 236. When this bit is set (by the host microcontroller 104, for example), the horizontal decimation filter 236 is enabled, otherwise the filter 236 is disabled. Accordingly, using the horizontal decimation filter enable bit permits horizontal decimation to be turned on or off.

Register 276 provides a similar enable bit (bit 1) for the horizontal interpolation filter 238. When bit 1 is set, the horizontal interpolation filter 238 is enabled, otherwise filter 238 is disabled. Bit 2 of register 276 is used to select-between two preprogrammed frequency responses for the horizontal interpolation 238. When this bit is a logic 1, frequency response 'A' is selected. When this bit is set to 0, frequency response 'B' is selected. The preferred preprogrammed frequency response 'A' is shown in FIG. 7A (gain response) and FIG. 7B (phase response) and its impulse response is shown in FIG. 7C. The gain, phase and impulse responses for the preprogrammed frequency response 'B' is shown in FIGS. 8A, 8B, and 8C, respectively.

Referring again to FIG. 6, bits [6:3] of register 276 are used to select the display mode. By using four bits to select the display mode, up to 16 different display modes are possible. The display mode bits preferably are encoded to provide Display Modes 0–11 as defined below. Other display modes can be defined if desired. Some modes relate to frames of video and other modes relate to "fields." In field-based video structures, each frame comprises two fields—an odd field and an even field—captured $\frac{1}{60}^{th}$ of second apart. The odd field includes the odd lines (lines 1, 3, 5, etc.) of the frame and the even frame includes the even lines (2, 4, 6, etc.).

In display Mode 0, the luma and chroma data remains unfiltered. The luma data is treated as "progressive," that is, each line of luma is displayed in both field times. The chroma data is both line and field repeated. "Chroma field repeat" refers to chroma data that is field independent, and the entire chroma data can be repeated in both field times. "Chroma line repeat" refers to repeating the chroma data on a line basis, for example, to convert from the 4:2:0 video format to the 4:2:2 format necessary for display. Each line of chroma in Mode 0 is displayed twice in both field times to achieve full-resolution 4:2:2 video.

Display Modes 0–3, 9, and 10 can be selected to vertically interpolate CIF resolution images (352×240) to full resolution. Display Mode 1 provides for progressive luma repositioning/chroma line and field repeat operations. "Repositioning" refers to filtering the data for better spatial representation of the pixel components (Y, Cr, Cb). The luma data is treated as a progressive frame and is vertically filtered using any suitable bilinear interpolation technique to improve luma positioning.

Mode 2 includes progressive luma and chroma field repeat repositioning. The luma data preferably remains unfiltered and is treated as a progressive frame. The chroma data is field repeated but filtered using bilinear interpolation to improve chroma positioning.

Mode 3 provides for progressive luma and chroma field repeat "letterbox" filtering (i.e., decimation). The progressive luma data is repeated each field time and decimated from four lines down to three using the four-tap vertical decimation filter 234 (FIG. 5). The chroma data is bilinearly interpolated to achieve the desire decimation. This display mode is designed for frame-structure, CIF-resolution images with 16:9 aspect ratio displayed on 4:3 screens. The main start and end row positions for the image must be adjusted to account for the 0.75 decimation. The total number of lines per field should be adjusted according to the following equation:

$$\text{LinesPerField}=0.75*(\text{MainEndRow}-\text{MainStartRow}+3) \qquad (1)$$

Display Mode 9 implements filtering for progressive luma repositioning and chroma field repeat repositioning. This display mode combines the luma component of Mode 1 and the chroma component of Mode 2 to achieve improved luma and chroma positioning. This mode is best suited for frame-based SIF images such as in the known MPEG-1 standard.

Display Mode 10 implements filtering for progressive luma repositioning and "interlaced" chroma repositioning. "Interlaced" implies the image contains temporal (time) differences between the two fields (odd/even). Both the luma and chroma data is treated as interlaced. The odd lines of the frame are used to interpolate the top field, while the even lines of the frame are used to interpolate the bottom field. This mode is best suited for field-structure, CIF-resolution images or CIF-format MPEG-2 images.

Display Modes 4—8 and 11 are provided for enhancing the display of full-resolution images. Display Mode 4 is interlaced chroma with chroma field repeat. The luma data is treated as interlaced while the chroma data is repeated in its entirety in both the odd and even field times. This display mode is preferred for frame-structure, full-resolution pictures.

Display Mode 5 provides for interlaced luma/chroma field repeat with repositioning. The luma data is treated as interlaced. The chroma data is repeated in its entirety for both fields, but is filtered to improve its spatial positioning. This mode is preferred for frame-structure pictures.

Display Mode 6 provides for interlaced luma and chroma line repeat in which the luma data is treated as interlaced. The chroma data is treated as interlaced and is line repeated to achieve the 4:2:0 to 4:2:2 chroma conversion. This display mode is suitable for either field- or frame-structure images.

Display Mode 7 provides for interlaced luma and interlaced chroma with repositioning. Both the luma and chroma data are treated as interlaced. The chroma data is filtered using the bilinear chroma filter to improve chroma positioning. This display mode is suitable for either field- or frame-structure images.

Display Mode 8 provides for interlaced luma and interlaced chroma with 0.75 letterbox filtering. Both the luma and chroma data are treated as interlaced and processed through the vertical filter 234 to achieve decimation of four lines down to three. The main start and end rows must be adjusted to account for this 0.75 decimation. The total number of lines per field should be adjusted according to the following equation:

$$\text{MainEndRow} - \text{MainStartRow} + 1 = (0.75 * \text{lines/field}) - 2 \quad (2)$$

Display Mode 11 provides for interlaced luma and chroma with 0.5 letterbox filtering. Both the luma and chroma data are treated as interlaced and processed through the vertical filter 234 to achieve decimation of four lines down to two. The main start and end rows must be adjusted to account for this 0.5 decimation. The total number of lines per field should be adjusted according to the following equation:

$$\text{MainEndRow} - \text{MainStartRow} + 1 = (0.5 * \text{lines/field}) - 2 \quad (3)$$

Horizontal filtering is implemented in the preferred embodiment as two separate horizontal post processing filters 236 and 238. Horizontal decimation filter 236 preferably comprises a 2:1 horizontal decimation filter and horizontal interpolation filter 238 is implemented as an eight-tap interpolation filter (i.e., computes a weighted average of eight values). These filters are provided for scaling images horizontally along the scan line of the image The horizontal decimation filter 236 preferably comprises a bilinear averaging filter that decimates two pixels down to one along the horizontal scan line. This filter may be used in conjunction with the vertical filter (configured for 0.5 decimation) for displaying pictures at ¼ resolution. Such an application may require a four-frame store system to account for the higher bandwidth requirements.

Regardless of the input picture resolution, the horizontal interpolation filter 238 can provide up to 720 pixels on each scan line. In addition to its interpolation features, the filter 236 also provides fine-scale horizontal pan and scan to within $\frac{1}{8}^{th}$ of a pixel during pan and scan operations. This filter is used for both luminance and chrominance data.

The horizontal interpolation 238 is implemented preferably using an eight-tap polyphase filter and is capable of generating up to eight unique, subpixel values between two consecutive pixels on a scan line. The generation of pixels depends upon the ratio between the width of the source image and the filtered output image. Typically, the output image width is 720 pixels.

The scale factor of the horizontal interpolation filter 238 is the ratio between the widths of the source image and the output image and can be set by the host microcontroller 102 in $\frac{1}{256}^{th}$ of a pixel increment via the one byte horizontal filter scale register 277 shown in FIG. 6. The interpolation filter 238 preferably calculates the subpixel position to within $\frac{1}{256}^{th}$ of a pixel.

The preferred filter architecture thus includes a three stage filter. The first stage includes vertical filter. The second stage includes a horizontal decimation filter. The third filter stage includes a horizontal interpolation filter. This preferred architecture offers several benefits. Decimation generally involves a higher bandwidth operation because the decimation filter must read in much more data than it generates. A 2:1 decimation filter, for example, reads in twice as much data as it generates. By placing the higher bandwidth decimation filters 234, 236 before the lower bandwidth interpolation filter 238 the overall filtering system can operate at a lower bandwidth than otherwise possible and more efficiently.

Further, horizontal interpolation involves generating more pixels in each line or row of an image. Thus, if the horizontal interpolation filter was provided before the vertical filter, the vertical filter would have to process more pixels, thereby slowing down the overall throughput of the filter 233. Accordingly, placing the decimation filters before the interpolation filter permits the decimation filters advantageously to process less data than otherwise would be required.

Additionally, as noted above, the horizontal interpolation filter 238 preferably comprises an 8-tap filter, horizontal interpolation filter. By positioning this filter as the last filter stage, the filter 238 can operate at the slower display rate, rather than the faster rate of the decimation filters 234 and 236. If the horizontal interpolation filter 238 was forced to operate faster (which would be the case if the filter 238 comprised the first stage of filter unit 233), horizontal interpolation filter 238 would have to be redesigned to add additional multipliers and accumulators running concurrently. The resulting filter design thus would require more logic and consequently its cost would be substantially higher. The preferred filter architecture thus minimizes the cost of the most expensive component of filter unit 233 (the horizontal interpolation filter 238). The filter architecture of the preferred embodiment thus achieves high quality, yet runs efficiently and can be implemented at a lower cost than otherwise would be required for other filter designs.

The above discussion is meant to be illustrative of the principles of the present invention. Numerous variations and modifications will become apparent to those skilled in the art once the above disclosure is fully appreciated. It is intended that the following claims be interpreted to embrace all such variations and modifications.

What is claimed is:

1. A video filter unit receiving a digital input video image and generating a filtered output image, comprising:
   a vertical filter;
   a horizontal decimation filter coupled to the vertical filter and configured to convert a data stream having a first bitrate into a data stream having a bitrate that is one half the first bitrate; and
   a horizontal upsampling filter coupled to the horizontal decimation filter, said horizontal upsampling filter providing the output image,
   wherein said horizontal decimation filter provides output data that is processed by the horizontal upsampling filter.

2. The video filter unit of claim 1 wherein said vertical filter connects to the horizontal decimation filter which connects to the horizontal upsampling filter and the vertical filter receives the digital input video image and the horizontal upsampling filter generates the filtered output image.

3. The video filter unit of claim 2 wherein said vertical filter is capable of vertical decimation.

4. The video filter unit of claim 3 wherein said vertical filter is also capable of vertical interpolation.

5. The video filter unit of claim 2 wherein said horizontal upsampling filter comprises an eight-tap filter.

6. The video filter unit of claim 5 wherein said vertical filter comprises a four-tap filter.

7. The video filter unit of claim 2 wherein said vertical filter, horizontal decimation filter and said horizontal upsampling filter are programmable.

8. The video filter unit of claim 7, wherein said horizontal decimation filter can be disabled.

9. The video filter unit of claim 7 wherein said horizontal upsampling filter can be disabled.

10. A video processing system, comprising:
    a host microcontroller;
    a memory device coupled to the microcontroller for storing video data; and a multi-stage video filter including a vertical filter, a horizontal decimation filter, and a horizontal upsampling filter, wherein said vertical filter comprises a first stage of said video filter and the horizontal decimation and upsampling filters comprise other stages of the video filter, wherein the horizontal decimation filter reduces the bitrate of a video data stream by a factor of 2, and wherein said horizontal decimation filter provides output data that is processed by the horizontal upsampling filter.

11. The video processing system of claim 10 wherein said horizontal decimation filter comprises a second stage of the video filter and follows the first stage.

12. The video processing system of claim 11 wherein said horizontal upsampling filter comprises a third stage of the video filter following the second stage.

13. The video processing system of claim 12 further including a host interface coupling the host microcontroller to the multi-stage video filter, said host interface including a plurality of programmable registers for configuring the video filter.

14. The video processing system of claim 10 wherein video processing system generates output video data to be displayed on a display at a display rate and said horizontal upsampling filter generates output values substantially equal to the display rate.

* * * * *